US005339927A

United States Patent [19]

Truax

[11] Patent Number: 5,339,927

[45] Date of Patent: Aug. 23, 1994

[54] AUXILIARY SUPPORT MECHANISM FOR AN AUTOMOTIVE HOIST

[76] Inventor: Alfred Truax, 38530 Orangelawn, Livonia, Mich. 48150

[21] Appl. No.: 966,409

[22] Filed: Oct. 26, 1992

[51] Int. Cl.[5] .......... B60S 13/00

[52] U.S. Cl. .......... 187/8.49; 248/206.5; 248/351

[58] Field of Search .......... 187/8.47, 8.49, 8.41; 284/2 C, 2 B, 93 L, 93 R; 248/127, 188.8, 188.1, 206.5, 351

[56] References Cited

U.S. PATENT DOCUMENTS

| | | | |
|---|---|---|---|
| 2,794,263 | 6/1957 | Cranmer | 248/206.5 |
| 2,804,766 | 9/1957 | Landman, Jr. | 248/351 |
| 2,956,643 | 10/1960 | Halstead | 187/8.49 |
| 3,017,036 | 1/1962 | Albert et al. | 248/206.5 |
| 3,333,091 | 9/1974 | MacPherson | 187/8.49 |
| 3,363,724 | 11/1974 | Quatkemeyer | 187/8.49 |

FOREIGN PATENT DOCUMENTS

| | | | |
|---|---|---|---|
| 1145597 | 10/1957 | France | 187/8.49 |
| 1129285 | 1/1967 | France | 187/8.49 |
| 4179700 | 6/1992 | Japan | 187/8.47 |

OTHER PUBLICATIONS

Publication to "Port-a-leg", Port-a-leg Corp. 38530 Orangelawn Livonia Mich. 48150.

*Primary Examiner*—Kenneth W. Noland
*Attorney, Agent, or Firm*—Charles W. Chandler

[57] ABSTRACT

An auxiliary safety support mechanism for an automotive hoist includes an elongated post having permanent magnets arranged at spaced points along its length. When the hoist is in its elevated position, the post can be manually inserted between the hoist platform and the floor surface, such that the post prevents the hoist platform from falling, due e.g. to malfunction of the hoist hydraulic system. The permanent magnets serve to detachably mount the post in a vertical position in which its axis is parallel to the piston axis.

8 Claims, 2 Drawing Sheets

AUXILIARY SUPPORT MECHANISM FOR AN AUTOMOTIVE HOIST

BACKGROUND OF THE INVENTION

This invention relates to automotive hoists, and particularly to a portable auxiliary support mechanism that is installed between the service station floor and the hoist platform so that the platform remains in its elevated position if the hydraulic lifter system fails or malfunctions.

Automotive hoists are commonly used in service stations to support automobiles in elevated positions above the floor surface when it is desired to perform service work. Such hoists are usually elevated by pumping hydraulic fluid from a reservoir into a vertical cylinder. A vertical piston is raised from the cylinder to raise the hoist structure and automobile to an elevated position. The hoist is lowered toward the floor by releasing the hydraulic fluid from the cylinder back to the reservoir so that the weight of the hoist and load lowers the hoist.

As a safety feature, automotive hoists are very often equipped with auxiliary safety devices that automatically support the hoist in the elevated position if the hydraulic system should fail or malfunction. The safety devices are usually built into the hoist structure at the time of manufacture or installation.

U.S. Pat. No. 2,956,643 which was issued to J. H. Halstead on Oct. 18, 1960, discloses a safety device that includes an auxiliary piston telescopically fitted into a vertical cylinder that is sunk into the floor adjacent the main hoist cylinder. The upper end of the auxiliary piston is attached to the hoist platform to extend out of the vertical cylinder as the hoist is raised from the floor. A latching bar, pivotally carried by the auxiliary piston, drops under the influence of gravity to a position extending across the upper end of the auxiliary cylinder, thereby blocking the auxiliary piston from falling in its cylinder. The auxiliary piston—cylinder mechanism functions as a safety device preventing the hoist from inadvertently falling.

U.S. Pat. No. 3,833,091, issued to R. MacPherson on Sep. 3, 1974, discloses a safety device of the piston-cylinder type, wherein the auxiliary piston is held in its elevated position by two ball-shaped detents seated in convergent grooves at the upper end of the associated cylinder. The ball-shaped detents are wedged between the groove surfaces and the piston side surfaces to normally hold the auxiliary piston in its elevated position. By rotating the piston around its axis, it is possible to register two flat side surfaces of the piston with the ball detents, whereby the ball detents no longer act as wedge locking elements. The piston is thus freed to drop into the associated cylinder.

In the above-described patented arrangements, the auxiliary support mechanisms are built into the hoist structure when originally manufactured. The support mechanism has to be installed in the service station floor as part of the process of installing the hoist mechanism.

Many hoists have been built without auxiliary support mechanisms. The safety support mechanisms shown in the above-noted patents cannot be economically added to such hoists because of the difficulties involved in embedding the auxiliary cylinder in the floor. Considerable expense would be involved in drilling a vertical hole in the cement floor with sufficient precision to accurately locate the auxiliary piston.

SUMMARY OF THE INVENTION

The present invention is directed to an auxiliary support mechanism that can be used with existing automotive hoists without modifying the hoist, and without drilling a hole in the concrete floor in order to install the mechanism.

In a preferred form of the invention, the auxiliary support mechanism comprises a portable post structure having two permanent magnets located at spaced points along its length. The post structure is magnetically connected to the hoist piston when the hoist is raised to its elevated position. The post structure extends between the hoist platform and the floor surface so as to prevent the platform from inadvertently falling in the event that the hoist hydraulic system should fail or malfunction. The magnets permit the post structure to be manually pulled away from the hoist piston when the user desires to lower the platform to the floor.

THE DRAWINGS

DESCRIPTION OF THE PREFERRED EMBODIMENT

Figure 1:
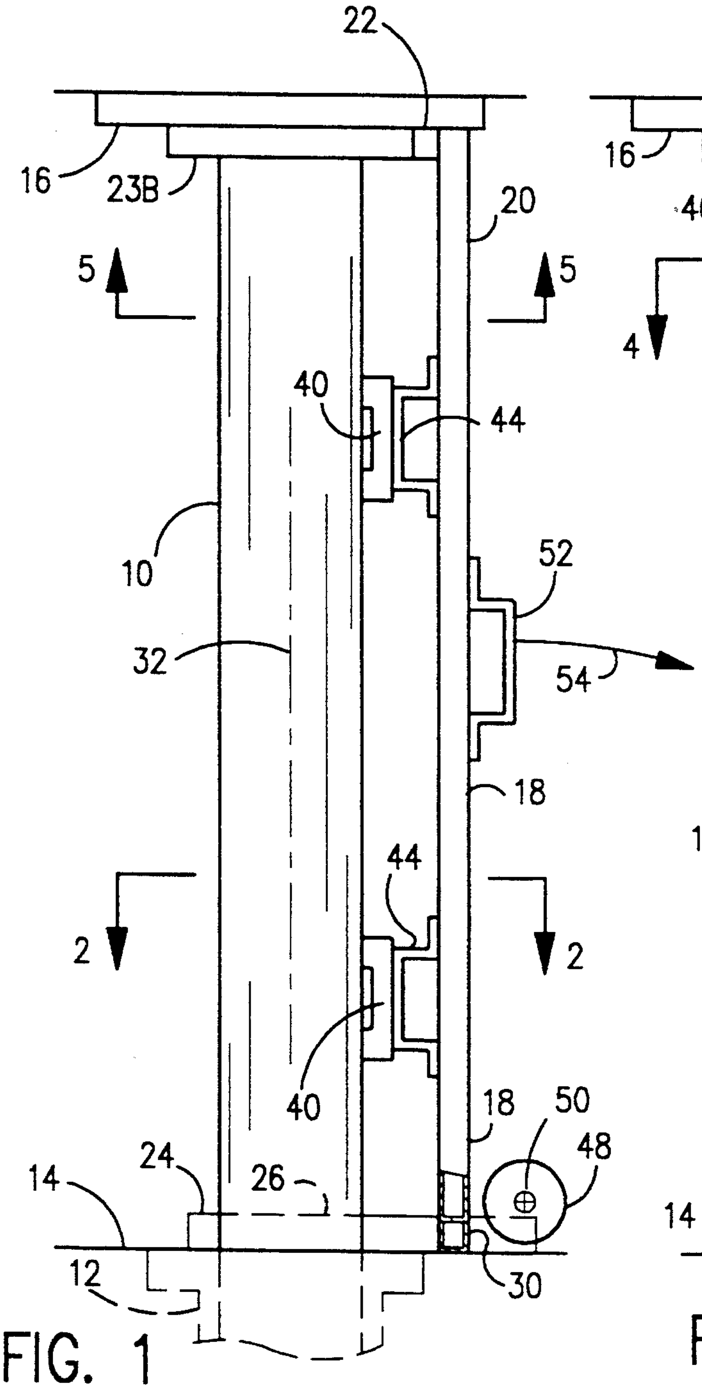
FIG. 1 is a side elevational view of an auxiliary support mechanism embodying features of the invention; portions of the mechanism are shown in section to illustrate structural details. The mechanism is depicted in the installed position clamped to the hoist piston.
Figure 2:
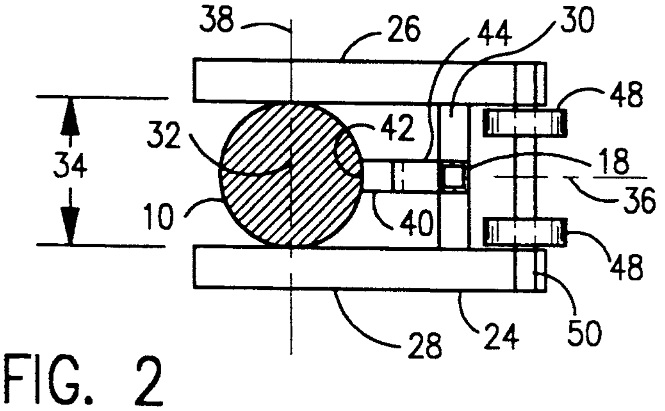
FIG. 2 is a sectional view taken on line 2—2 in FIG. 1.

FIGS. 1 and 2 fragmentarily show a conventional automotive hoist having a vertical piston 10 telescopically mated to a cylinder 12 that is embedded in a concrete floor having a floor surface 14. Piston 10 is shown in its raised position for supporting hoist platform 16 in an elevated position, approximately six feet above floor surface 14. The piston is supported by pressurized hydraulic fluid in cylinder 12, below the piston. Suitable valving is associated with the piston-cylinder mechanism, whereby the hydraulic fluid can be exhausted from the cylinder to permit piston 10 to drop under the influence of gravity in the cylinder, thereby enabling platform 16 to be lowered to a position resting on floor surface 14.

Platform 16 serves as a support device for two spaced parallel tracks (not shown) to accommodate the wheels of an automobile or truck. The vehicle is driven onto or off the tracks. When platform 16 in its raised position, a mechanic can stand on floor surface 14 to repair or service the vehicle.

The present invention is concerned with an auxiliary support mechanism that is located between floor surface 14 and hoist platform 16 to prevent the hoist from falling in the event of a hydraulic system malfunction. As shown in FIGS. 1 and 2, the auxiliary support mechanism comprises a post 18 constructed out of steel tubing. The tubing preferably has a cross sectional dimension measuring about two inches on each side, with a wall thickness of about one quarter inch.

Figure 5:
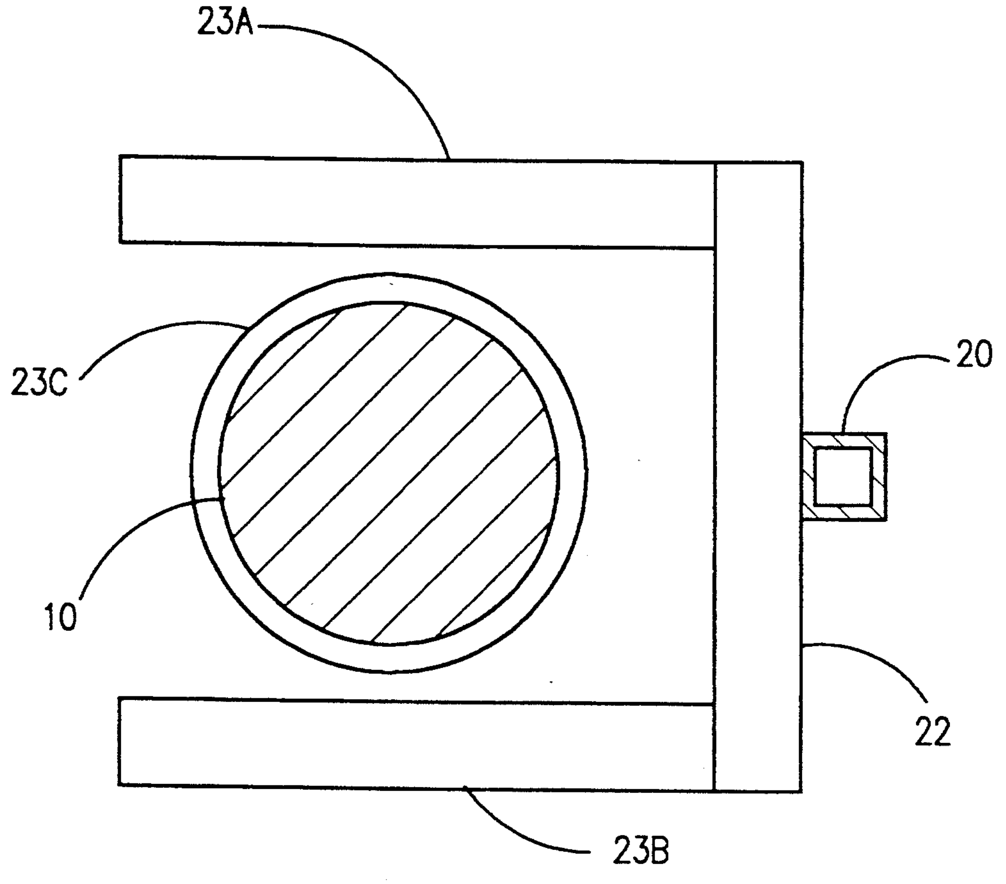
FIG. 5 is a view taken along line 5—5 of FIG. 1.

The upper end 20 of post 18 is attached to a cross bar 22. As best shown in FIG. 5, two parallel spaced bars 23A and 23B are disposed on opposite sides of an annular shoulder 23C at the upper end of the piston. Bars 23A and 23B engage the hoist if it should fall.

At it's lower end, post 18 is attached to a foot structure 24, that includes two parallel bars 26 and 28, and a connecting crossbar 30. Post 18 is attached to crossbar 30 at a point midway between parallel bars 26 and 28. Bars 26, 28 and 30 are constructed from steel tubing having the same cross sectional dimensions as the tubing used for post 18.

As shown in FIG. 1, bars 26, 28 and 30 are located in a common horizontal plane extending normal to the longitudinal axis of post 18. When the foot structure has its flat lower surface positioned on floor surface 14, the post extends vertically on a line paralleling the axis 32 of hoist piston 10. Bars 26 and 28 are spaced by a distance 34 slightly greater than the diameter of piston 10. When the auxiliary support mechanism is moved to the position shown in FIGS. 1 and 2, bars 26 and 28 guide and locate the piston so that post 18 is located in an imaginary vertical plane 36 extending through piston axis 32 and normal to a second vertical plane 38 passing through piston axis 32 and the points or the piston side surface closely adjacent bars 26 and 28.

Two permanent magnets 40 are carried by post 18 near its upper and lower ends. Each magnet is coated with urethane so as not to scratch or mar the piston surface. Each magnet has its north and south poles vertically spaced so as to lie in the aforementioned vertical plane 36 (FIG. 2). Each pole of a given magnet preferably has its surface curved negatively to conform to the piston side surface curvature, as shown at 42 in FIG. 2. The magnetic poles thus have their entire surface areas engaging the piston side surface. Each magnet 40 magnetically connects post 18 to the hoist piston 10.

Each magnet is 8 inches long by 1½ inches wide, and has a holding value of 120. The holding value is the pull off force of a one inch segment of the bar. Such bars are available from suppliers such as Storch Products Company Inc. of Livonia, Mich. The magnets prevent the post from slipping away from the post.

Each magnet 40 is supported on post 18 by a bracket 44, that is constructed on a non-magnetic (non-permeable) material, such as aluminum or plastic. The magnets are thus magnetically isolated from steel post 18, whereby the magnetic flux is confined to the magnets and the side surface of piston 10. Each bracket 44 locates post 18 about 4½ inches from the piston such that the post upper end is outboard from piston shoulder 23C. The vertically oriented post is designed to underlie platform 16 rather than piston flange 46.

FIG. 2 shows post 18 in a position located on one side of piston axis 32. However, the post 18 can be located at any desired point around the piston circumference.

To facilitate moving the auxiliary support mechanism to or from its installed position, the mechanism is equipped with roller means, designated by numeral 48 in FIGS. 1 and 2. The roller means comprises two spaced rollers mounted on a transverse axle 50 that spans bars 26 and 28. In the position of the mechanism depicted in FIGS. 1 and 2, the rollers are raised above floor surface 14. However, the mechanic can pull handle 52 to tilt post 18 from its vertical position, thereby lowering the rollers to the floor surface. In FIG. 1 the tilting motion of the post is designated generally by arrow 54.

Rollers 48 are useful for readily moving the mechanism to and from its position connected to piston 10. FIGS. 1 and 2 represent the installed position of the auxiliary support mechanism. In order to lower the hoist to floor level, it is first necessary to move the auxiliary support mechanism from its FIG. 1 position, e.g. by tilting post 18 and rolling it to a remote position.

Figure 3:
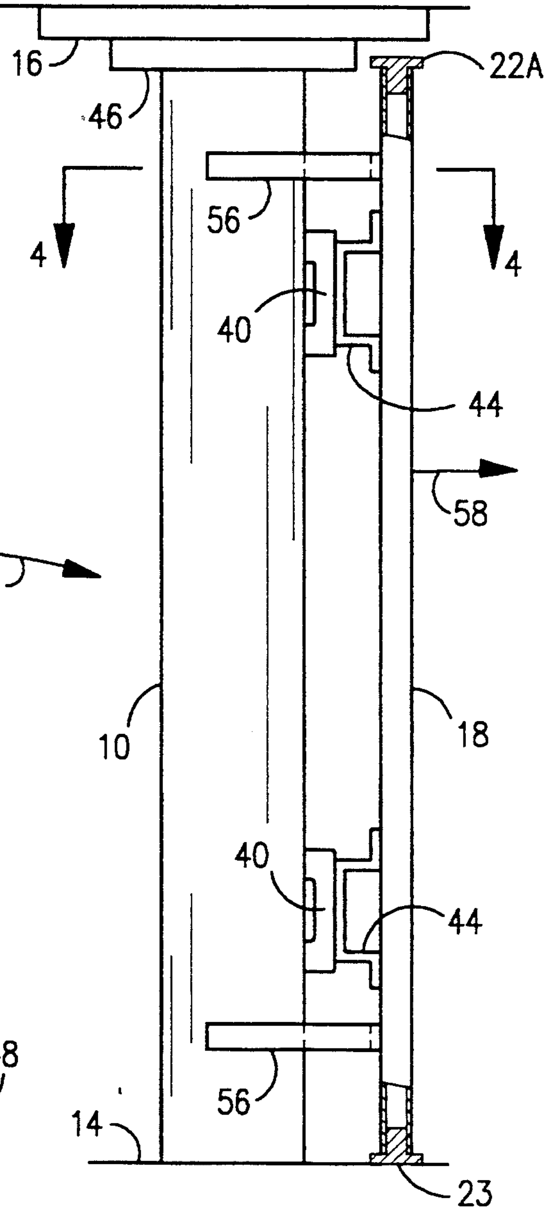
FIG. 3 is a view taken in the same direction as FIG. 1, but illustrating another form of the invention.
Figure 4:
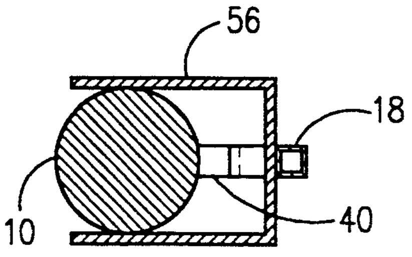
FIG. 4 is a sectional view taken on line 4—4 in FIG. 3.

FIGS. 3 and 4 illustrate a second form of the invention, wherein post 18 has an upper cap 22A at its upper end, and a second cap 23 at its lower end engageable with floor surface 14. Two U-shaped guides 56 are connected to post 18 near its upper and lower ends to straddle piston 10 and locate the post in a vertical position parallel to the piston.

In use, the embodiment of FIGS. 3 and 4 performs essentially the same as the FIG. 1 embodiment. In each case, two permanent magnets 40 are used to magnetically connect post 18 in a vertical position extending alongside the hoist piston 10. Post 18, in the FIG. 3 embodiment, is disengaged from the piston by pulling the post away from the piston in the direction designated by numeral 58 in FIG. 3.

The drawings show particular structural embodiments of the invention. However, the invention can take various forms and configurations.

I claim:

1. An auxiliary support mechanism for a piston actuated automotive hoist, wherein the piston has a vertical axis and a cylindrical side surface; said support mechanism comprising a portable support post having a longitudinal axis, a lower end, and an upper end; an upper magnet carried by said post near its upper end; a lower magnet carried by said post near its lower end; each magnet being located equidistant from the post axis, whereby the support mechanism can be magnetically releasibly connected to the piston side surface so that the post axis is vertical and parallel to the piston axis;

a foot structure extending right angularly from said post at its lower end; said foot structure having a flat planar lower surface whereby the foot structure can be positioned on a floor surface to support the post in a vertical position extending alongside the piston; and said foot structure comprising two parallel bars spaced by a distance that generally corresponds to the diameter of the piston, and a connecting cross bar extending between said parallel bars; said support post having its lower end connected to said cross bar at a point midway between the parallel bars, such that the foot structure can be positioned on a floor surface with the parallel bars straddling said piston.

2. The auxiliary support mechanism of claim 1, and further comprising a roller means carried on the foot structure; said roller means having an axle extending parallel to said cross bar, such that said rollers means is spaced a slight distance above the foot structure lower surface when the foot structure is positioned on a floor surface; said support mechanism being adapted to be tilted to a position wherein said roller means is engaged with the floor surface, whereby the support mechanism can be rolled to and from said piston.

3. The auxiliary support mechanism of claim 1, and further comprising a roller means carried on the foot structure; said roller means having an axle extending parallel to said cross bar, such that said roller means is spaced a slight distance above the foot structure lower surface when the foot structure is positioned on a floor surface; said support mechanism being adapted to be tilted to a position wherein said roller means is engaged with the floor surface, whereby the support mechanism can be roller to and from said piston.

4. An auxiliary support mechanism for a piston actuated automotive hoist, wherein the piston has a vertical axis and a cylindrical side surface; said support mechanism comprising a portable support post having a longitudinal axis, a lower end, and an upper end; an upper magnet carried by said post near its upper end; a lower magnet carried by said post near its lower end; each magnet being located equidistant from the post axis, whereby the support mechanism can be magnetically releasibly connected to the piston side surface so that the post axis is vertical and parallel to the piston axis; and two spaced members extending from said post on opposite sides of the piston side surface, such that the magnet poles are substantially located in a vertical plane passing through the piston axis.

5. The auxiliary support mechanism of claim 4, wherein said spaced members comprise two parallel bars extending normal to the post axis at the lower end of the post, whereby said bars are adapted to seat on a floor to support the post in a vertical position alongside the piston.

6. An auxiliary support mechanism for a piston actuated automotive hoist, wherein the piston has a vertical axis and a cylindrical side surface; said support mechanism comprising a portable support post having a longitudinal axis, a lower end, and an upper end; an upper magnet carried by said post near its upper end; and lower magnet carried by said post near its lower end; each magnet being located equidistant from the post axis, whereby the support mechanism can be magnetically releasibly connected to the piston side surface so that the post axis is vertical and parallel to the piston axis;

two spaced guide members extending from said post on opposite sides of the piston side surface, such that the magnet poles are substantially located in a vertical plane passing through the piston axis;

said guide members comprising two parallel bars extending normal to the post axis at the lower end of the post, whereby said bars are adapted to seat on a floor to support the post in a vertical position alongside the piston.

7. An auxiliary support mechanism for a piston actuated automotive hoist, wherein the piston has a vertical axis and a cylindrical side surface; said support mechanism comprising a portable support post having a longitudinal axis, a lower end, and an upper end; an upper magnet carried by said post near its upper end; a lower magnet carried by said post near its lower end; each magnet being located equidistant from the post axis, whereby the support mechanism can be magnetically connected to the piston side surface so that the post axis is vertical and parallel to the piston axis; and a foot structure extending right angularly from said post at its lower end; said foot structure having a flat planar lower surface, whereby the foot structure can be positioned on a floor surface to support the post in a vertical position extending alongside the piston; and roller means carried by the foot structure for rolling engagement with the floor surface when the post is tilted away from its vertical position.

8. An auxiliary support mechanism for a piston actuated automotive hoist, wherein the piston has a vertical axis and a cylindrical side surface; said support mechanism comprising:

a portable support post having a longitudinal axis, a lower end, and an upper end;

an upper magnet carried by said post near its upper end; a lower magnet carried by said post near its lower end;

each magnet being located equidistant from the post axis, whereby the support mechanism can be magnetically releasibly connected to the piston side surface so that the post axis is vertical and parallel to the piston axis;

a foot structure extending right angularly from said post at its lower end;

said foot structure having a flat planar lower surface, whereby the foot structure can be positioned on a floor surface to support the post in a vertical position extending alongside the piston; and roller means carried by the foot structure for rolling engagement with the floor surface when the post is tilted away from its vertical position.

* * * * *